(12) United States Patent
Aisa

(10) Patent No.: US 7,363,031 B1
(45) Date of Patent: Apr. 22, 2008

(54) SYSTEM FOR MONITORING AND CONTROLLING A SET OF HOUSEHOLD APPLIANCES

(75) Inventor: Valerio Aisa, Fabriano (IT)

(73) Assignee: Indesit Company S.p.A., Fabriano (IT)

( * ) Notice: Subject to any disclaimer, the term of this patent is extended or adjusted under 35 U.S.C. 154(b) by 0 days.

(21) Appl. No.: 10/110,249

(22) PCT Filed: Feb. 1, 2000

(86) PCT No.: PCT/IB00/00095

§ 371 (c)(1),
(2), (4) Date: Apr. 10, 2002

(87) PCT Pub. No.: WO01/28068

PCT Pub. Date: Apr. 19, 2001

(30) Foreign Application Priority Data

Oct. 13, 1999 (IT) ............................... TO99A0891

(51) Int. Cl.
H04M 3/00 (2006.01)

(52) U.S. Cl. ...................... 455/419; 455/418; 455/420; 455/466; 455/41.2; 340/825.22; 340/825.24; 340/825.69; 340/3.1; 340/3.71; 340/3.8; 340/7.1; 379/100.05; 379/106.03; 379/110.01

(58) Field of Classification Search ........ 455/418–420, 455/66.1, 550.1, 557, 552.1, 422.1, 466, 455/41.2; 340/825.22, 310.06, 3.1, 3, 310.16, 340/825.24, 825.25, 825.69, 825.72, 3.43, 340/3.7, 3.71, 3.8, 7.1; 379/102.01–102.03, 379/110.01, 100.05, 106.03
See application file for complete search history.

(56) References Cited

U.S. PATENT DOCUMENTS

| | | | | |
|---|---|---|---|---|
| 4,837,414 A | * | 6/1989 | Edamula | 219/714 |
| 5,051,720 A | * | 9/1991 | Kittirutsunetorn | 340/310.12 |
| 5,491,831 A | * | 2/1996 | Williams et al. | 455/66.1 |
| 5,566,232 A | * | 10/1996 | Sizer, II | 379/142.17 |
| 5,671,267 A | * | 9/1997 | August et al. | 455/420 |
| 5,680,445 A | * | 10/1997 | Bogner et al. | 379/106.01 |
| 5,748,104 A | * | 5/1998 | Argyroudis et al. | 340/870.11 |
| 5,802,467 A | * | 9/1998 | Salazar et al. | 455/420 |
| 5,838,226 A | * | 11/1998 | Houggy et al. | 340/310.11 |
| 5,894,278 A | * | 4/1999 | Kubo et al. | 340/825.72 |
| 5,909,183 A | * | 6/1999 | Borgstahl et al. | 340/825.22 |
| 5,923,739 A | * | 7/1999 | Disalvo | 379/102.03 |
| 5,963,624 A | * | 10/1999 | Pope | 379/110.01 |
| 6,021,324 A | * | 2/2000 | Sizer et al. | 455/403 |
| 6,026,150 A | * | 2/2000 | Frank et al. | 379/90.01 |

(Continued)

FOREIGN PATENT DOCUMENTS

DE 44 34 044 A1 3/1996

(Continued)

Primary Examiner—Sharad Rampuria
(74) Attorney, Agent, or Firm—Cesari and McKenna, LLP (57) ABSTRACT

A system for monitoring and controlling a set of power users, in particular household appliances, which users (U) are connected to a first communication network (RE) through appropriate interfacing means (N) for the exchange of information and/or instructions, where transmitter/receiver means (MC) connected to said first communication network (RE) are provided for establishing a communication channel to a second remote network (IN) and/or remote terminal (TC). According to the present invention, said transmitter/receiver means (MC) are associated to one of said electric users (LB) and share one of the interfacing means (N) associated to said user (LB).

42 Claims, 3 Drawing Sheets

U.S. PATENT DOCUMENTS

| | | | |
|---|---|---|---|
| 6,080,972 A * | 6/2000 | May | 219/494 |
| 6,175,860 B1 * | 1/2001 | Gaucher | 709/208 |
| 6,252,883 B1 * | 6/2001 | Schweickart et al. | 370/441 |
| 6,317,609 B1 * | 11/2001 | Alperovich et al. | 455/556.1 |
| 6,415,023 B2 * | 7/2002 | Iggulden | 379/102.03 |
| 6,510,209 B1 * | 1/2003 | Cannon et al. | 379/88.13 |
| 6,633,547 B1 * | 10/2003 | Akatsu et al. | 370/255 |
| 6,681,110 B1 * | 1/2004 | Crookham et al. | 455/420 |
| 6,687,487 B1 * | 2/2004 | Mosebrook et al. | 455/11.1 |
| 6,754,468 B1 * | 6/2004 | Sieben et al. | 455/41.2 |
| 2001/0039460 A1 * | 11/2001 | Aisa | 700/17 |
| 2001/0055965 A1 * | 12/2001 | Delp et al. | 455/420 |
| 2002/0110228 A1 * | 8/2002 | Silverman et al. | 379/110.01 |
| 2003/0027565 A1 * | 2/2003 | Bossemeyer et al. | 455/422 |
| 2004/0048622 A1 * | 3/2004 | Witkowski et al. | 455/456.6 |
| 2004/0058675 A1 * | 3/2004 | Lu et al. | 455/418 |

FOREIGN PATENT DOCUMENTS

| | | |
|---|---|---|
| EP | 0391316 A1 | 10/1990 |
| EP | 0620631 A1 | 10/1994 |
| EP | 0748105 A2 | 12/1996 |
| WO | WO 99/43068 | 8/1999 |

* cited by examiner

SYSTEM FOR MONITORING AND CONTROLLING A SET OF HOUSEHOLD APPLIANCES

The present invention relates to a system for monitoring and controlling one or more electric users, in particular household appliances, where said users are connected to a first communication network through appropriate interfacing means for the exchange of information and/or commands, where transmitting/receiving means connected to said first communication network are provided for establishing a communication channel to a second remote network and/or remote terminal.

As it is known, home automation, i.e. the exploiting of electronic technology in the household environment aiming at a reduction of managing costs for various users and the development of new comfort opportunities, is becoming more and more a reality. This is substantially due to:
- a growing diffusion of electronic consumption equipment, such as video-recorders. HI-FI systems, satellite receiver systems, safety and intrusion-proof systems, personal computers, mobile telephones, etc.
- recent considerable developments related to household appliances control systems based on the use of microcontrollers and new sensors, which are capable of dialog with the environment outside;
- a progressive establishment of standard communication buses, i.e. sets of rules defining information exchange procedures from the various household appliances to the physical means through which such information are transmitted.

Particularly important, with reference to the last point, is the communication means establishing itself as a standard in the household environment, i.e. the so-called power line, which is the power supply mains itself, to which information can be sent in the format of amplitude or frequency modulated small signals. The use of such a means, in fact, allows connection of household appliances to the power mains without the need of implementing any new or special wiring systems.

As a result, new opportunities based on the employment of the power line have arisen in connection with the problems related to a rationalization of household power consumptions and a more efficient handling of the information associated to household electric users.

Remote control systems for household electric users are also known, which employ communication means for communicating with a specific household appliance or the household power mains for controlling operation of one or more household appliances. The document IT.TO98A000134 issued in the Applicant's name discloses a system for the monitoring and remote technical service of household appliances pertaining to a household environment, which comprises a monitoring device capable of collecting—through a local network connected to said users—functional, diagnostic and statistical information generated by and transmitted from said users to said local network, and storing them in an appropriate memory. Such a monitoring device comprises appropriate means, in particular a GSM modem for receiving and managing the information received from the household appliances, where transmission of said information can take place at local level, i.e. directly to the consumer; at remote level inside the household environment, such as to a personal computer eventually available in such an environment adequately interfaced to said local network; finally at remote level outside the household environment, i.e. to a specific service centre.

Figure 1:
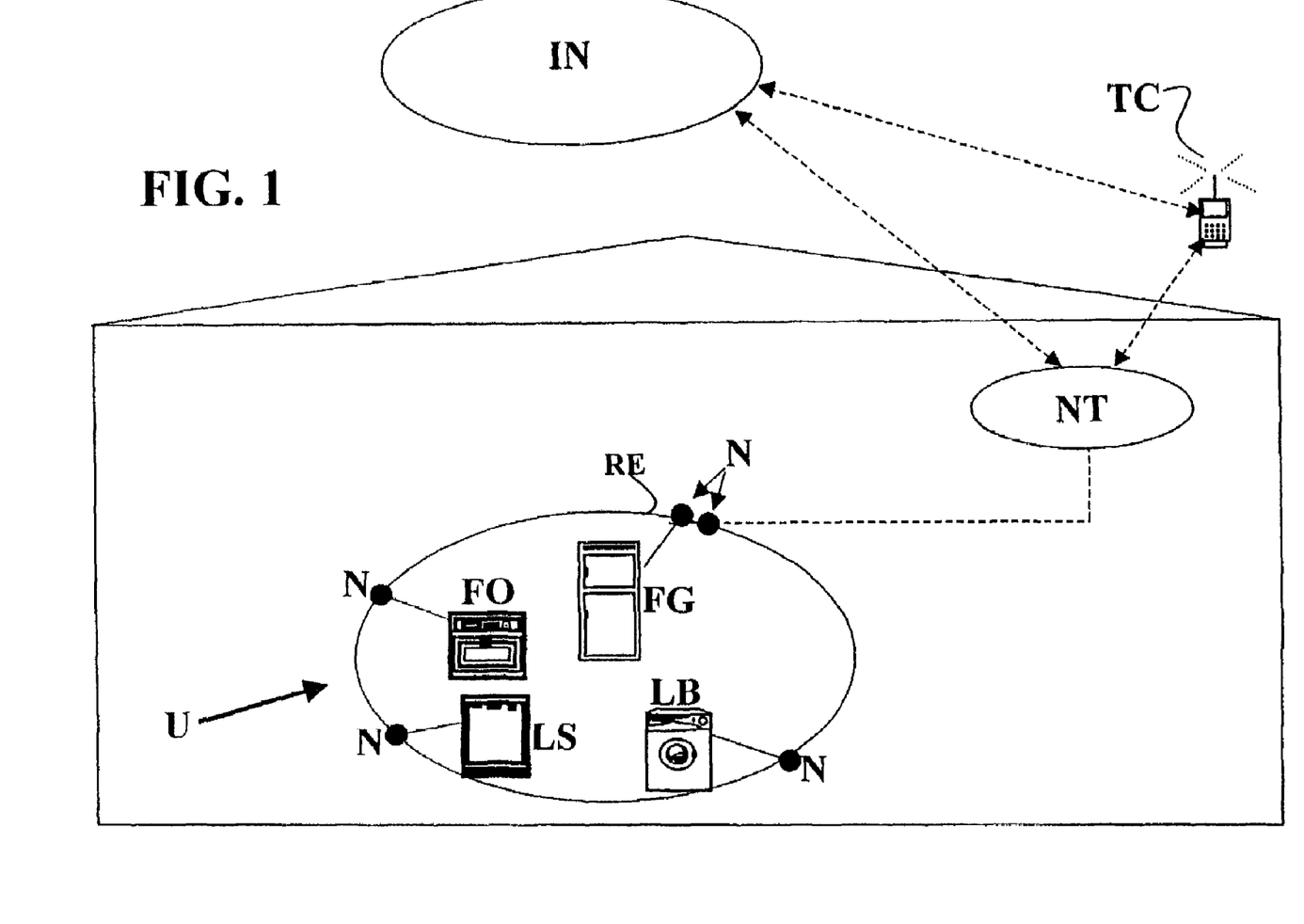
FIG. 1 shows a basic diagram of a system for monitoring and controlling a set of electric users, according to the known state of the art.

In FIG. 1 a system for the monitoring and remote service of household appliances is shown by way of example, representing a set of electric users consisting of household appliances, such as a laundry washing machine LB, an oven FO, a refrigerator FG and a dishwasher LS. Such a set of electric users U is connected to a local "power line" network RE, which has a telephone node NT corresponding to the above mentioned monitoring and controlling device and will then provide for transmission-reception of instructions and control through external systems.

Household appliances FO, LS, FG, LB will also be indicated in the following, since they are equipped with electronic control devices capable of complex functions, either as household appliances or "smart" users.

This communication system is known and allows information exchange between various interfacing modules indicated with N, through the same power supply cable, i.e. without requiring implementation of an extra wiring system in the house.

This interfacing module N forms the "communication node" through which each device connected to it is able to exchange information with the outside through the known power line technique. Therefore, each communication node is equipped with appropriate interfacing means to the same communication network RE; moreover it contains the control logic managing both the communication protocols to the bus (in other words the rules governing the information exchange with other network nodes) and information exchange with the device associated to it.

The technology related to network communication nodes and relevant protocols is known (reference is made e.g. to household bus systems, such as LonWorks, CEBus, EHS, EIB . . . ); therefore it will not be further investigated here.

The telephone node NT contains a modem, not shown in FIG. 1, through which the local network RE can communicate with an external network IN. e.g. Internet web, or directly, e.g. through WAP (Wireless Application Protocol) protocols, in order to draw information and transfer them to the local network RE and to the electric users U connected with it.

In FIG. 1 the telephone node NT is also apt to communicate with a mobile telephone TC.

Drawbacks arise in such a system due to the special supervision and control device corresponding to the telephone node NT of FIG. 1, which is interfacing between the local network and telecommunication means, the latter being either fixed or mobile phone means. Such a monitoring and control device has to provide for collecting all information and transmitting them to the outside or to the personal computer, so that the possibility of communicating with the household appliances is tied to the presence of said monitoring device in a special node of the local network.

If a local power line network is available, through which the household appliances are able to intercommunicate, a new interfacing module has to be necessarily implemented on the local network in order to add the possibility of communicating outside. i.e. a new node, to which the monitoring and control device will be expressly connected, with a consequent additional cost. Moreover, such a monitoring device has to be physically allocated inside the house, with a consequent increase of overall dimensions and difficulties in choosing its right location. Since such a monitoring and control device is associated to the availability of a local household appliances network, a further drawback arises if the consumer has a reduced appliances set or just one household appliance, as it will be difficult for a consumer to consider initial implementation of such a monitoring and control device as it would be appropriate.

It is the object of the present invention to solve the above drawbacks and provide a system for monitoring and controlling a set of electric users, having a more efficient and improved performance.

In this frame, it is the main object of the present invention to provide a system for monitoring and controlling a set of electric users, which does not require additional new nodes to let the users connected to a local network communicate with remote stations.

A further object of the present invention is to provide a system for monitoring and controlling a set of electric users, which does not cause any difficulties of allocation in a household environment.

A further object of the present invention is to provide a system for monitoring and controlling a set of electric users, which ensures availability of remote communication also in the event of a minimum electrical users set.

In order to achieve such aims, it is the object of the present invention to provide a system for monitoring and controlling a set of electric users, incorporating the features of the annexed claims, which form an integral part of the description herein.

Further objects, features and advantages of the present invention will become apparent from the following detailed description and annexed drawings, which are supplied by way of non limiting example, wherein.

Figure 2:
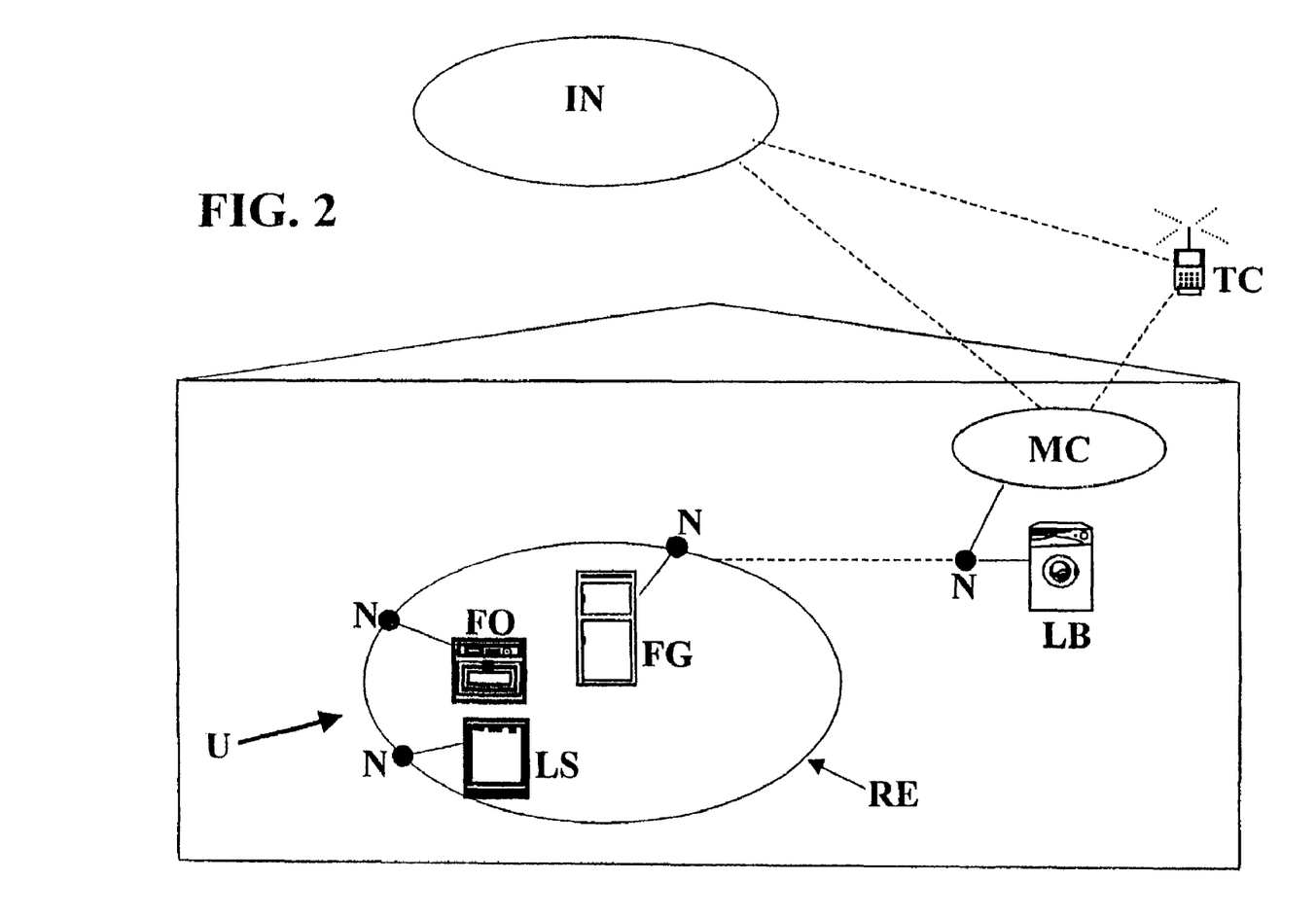
FIG. 2 shows a basic diagram of a detail of the system for monitoring and controlling a set of electric users, according to the present invention.

In FIG. 2 a system for monitoring and controlling a set of electric users is represented according to the present invention. This system reproduces the common parts according to the system shown in FIG. 1, but in this figure the laundry washing machine LB is separated from the set of electric users U and is connected to the local network RE by means of an interfacing module N contained in a telephone node MC.

This telephone node MC, as it will be better illustrated with reference to FIG. 3, contains a mobile phone modem MG, operating to GSM standard, and a communication node N interfacing with the local network RE. Thus, the telephone node MC will perform the functions of the telephone node NT of FIG. 1 for the electric users U, operating in quite an analogous manner. However, such a telephone node MC is associated to a specific user U. in this instance the washing machine LB, which is approached as if it were an interfacing module N between it and the local network RE. Therefore, as it can be noticed, this event does no longer require apposite gateways, i.e. shared communication gates, to the external network IN, whereas it is rather the household appliances themselves, in the specific case the washing machine LB, which act physically as gateways, in virtue of the modems associated to them through connection to the telephone node MC.

The telephone node MC, equipped with a modem MG, whose manufacture is known as such is able to manage digital transmission and is used for remote transmission of information to a likely Service and Preventive Maintenance Centre for the various household electric users.

TC also indicates an external GSM mobile telephone, which is capable of digital communication with the telephone node MC, in particular through SMS alphanumerical messages, which are more easily managed by the consumer.

Figure 3:
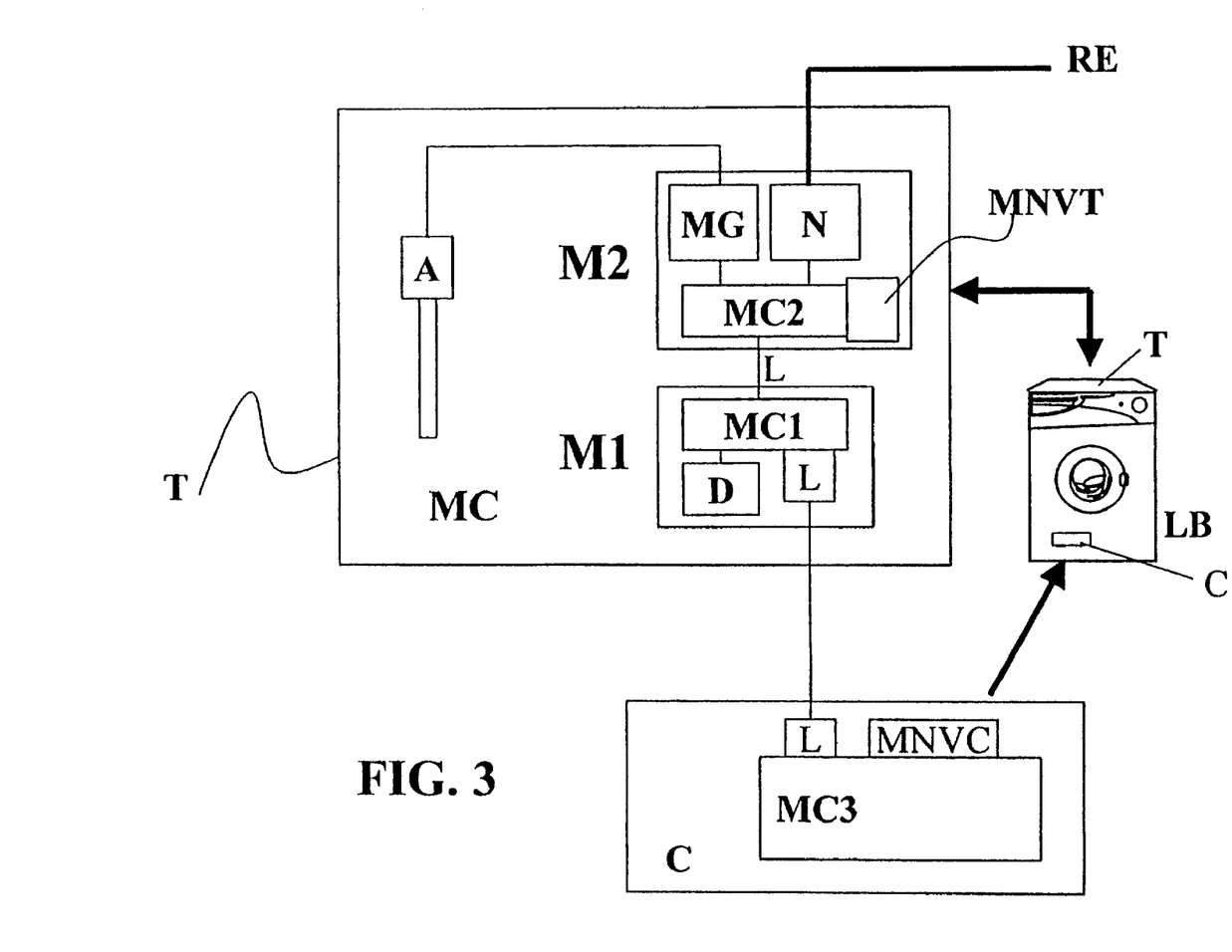
FIG. 3 shows a basic diagram of a detail of the system for monitoring and controlling a set of electric users of FIG. 2.

The telephone node MC, as it will be seen in FIG. 3, is equipped with appropriate means for:

collecting at regular intervals through the power mains RE itself, functional, diagnostic and statistical information generated by the "smart" users, such as FO, LS. FG and LB, recognizing for each one of them the user they come from;

storing said information on appropriate non volatile memory means;

making said information subsequently available outside through the telephone line, according to appropriate procedures.

In FIG. 3 a detail of the laundry washing machine LB is represented along with the telephone node MC.

The telephone node MC is contained inside a top panel T of the washing machine LB. Said top panel T, also called "top" is removable, or, in other words, it may be added optionally to a laundry washing machine previously preset for operation on the power mains RE, i.e. preset to be associated to an interfacing module N, the same as for the oven FO or dishwasher LS and the washing machine LS itself shown in FIG. 1 To this purpose the above top panel T contains the telephone node MC, which contains in turn:

a display module M1, equipped with a dedicated microcontroller MC1 able to manage a fluorescent display D, that is capable of displaying alphanumerical messages and communicate with an electronic control system C of the laundry washing machine through an asynchronous communication line L;

a modem module M2 consisting of the mobile phone module MG with a relevant aerial A and an interfacing module N, suitable for communication on power line networks, such as the local network RE, also comprising a microcontroller MC2 of adequate power, which is duly managing the mobile phone modem MG and the interface module N, communicating at the same time with the display module M1 through the asynchronous serial line L.

non volatile EEPROM memory means MNVT, for storing the data received from the power mains or from outside, which are particularly apt to obtain jointly with an appropriate software, such as contained in the program memory of the microcontroller MC2, an updated image of the information contained in the control means memory of the "smart" household appliances.

Both the modem module M2 and display module M1 contained in the top panel T of the washing machine LB dialog with the electronic control system C of the washing machine LB by means of a WRAP (Web Ready Appliance Protocol) protocol through the asynchronous serial line L, which is provided right for interfacing with the interface module N of the washing machine LB.

Therefore, the electronic control system C of the washing machine LB will see both the modem module M2 and display module M1 contained in the top panel T exactly like a standard communication node, whereas, vice-versa, both the modem module M2 and display module M1 contained in the top panel T will use the same communication procedures of the interfacing module N to the electronic control system C warranting its correct emulation.

This means that the telephone node MC emulating the interface module N can be interfaced to any other household appliance preset for connection to the local network RE through said interfacing module N.

The principle of a communication port or gateway associated to the washing machine LB can be clearly replicated also through any other electric user preset for communication on the network RE.

The electronic control system C comprises a microcontroller MC3 of its own and a non volatile memory MNVC.

The program of the microcontroller MC3 contains a WRAP (Web Ready Appliance Protocol) protocol managing the appliance operation, in the specific case the laundry washing machine LB. Through this protocol, an external electronic device, such as the mobile telephone TC capable of communication through the asynchronous serial line L, e.g. the module N interfacing the network, will be able perform at any time, without affecting correct operation of the household appliance, the following functions:

- reading any area of the memory RAM of the microcontroller MC3.
- writing any area of the memory RAM of the microcontroller MC3.
- reading any area of the non volatile memory MNVC.
- writing any area of the non volatile memory MNVC.
- total control of the household appliance, in the specific case the laundry washing machine LB, which becomes a peripheral or slave of the above external electronic device (master or supervisor), such as the mobile telephone TC.

The above five procedures interacting with the environment outside, which form the WRAP protocol basis, allow a household appliance implementing its capability of connection to the local network RE and access possibility to Internet web through any gateway capable of managing the protocol TCP/IP.

It should be noticed how the power line transmission system pertaining to the network RE, though being able to reach a speed of 4800 bps, is featured by a much lower speed (typically lower than 1200 bps) due to interferences on the communication line. On the contrary, with reference to data transmission through a mobile or conventional telephone line, much higher speeds can be reached for the conventional line (up to 56000 bps with the analog system and over 100000 bps with the digital system), whereas for mobile communication operation occurs presently at 9600 bps, but it is foreseen to have this speed increased of an order of magnitude with the system GPRS. Therefore, in order to obviate to the speed difference, the information that the telephone node MC is able to collect and store are generated by the "smart" household appliances FO, LS, LB e FG, as previously described.

The control system of each "smart" household appliance is programmed, in fact, according to known techniques, for storing at least diagnostic and statistical information at regular intervals in its non volatile memory means and then update their contents in time.

Moreover, the control system C of each household appliance can generate and send to the telephone node MC functional information of various nature, such as related to the operation program or cycle activated by the consumer, to the progress status or step of said program, to the instructions or option imparted by the consumer, to the timing associated to activations and deactivations of individual electric loads, to likely abnormal behaviours of some components, etc.

Equally, the microprocessor MC2 of the telephone node MC is programmed to request at regular intervals (e.g. every 10 minutes or other time interval, eventually programmable through appropriate external means that may be associated to the same power line communication system), always through the communication line consisting of the power mains RE itself, such information that may become available from time to time, which are generated by the control systems C of each "smart" household appliance; said information are collected in appropriate non volatile memory means MNVT available to the telephone node MC itself. Therefore, the "data base" associated to the memory means MNVT of the telephone node MC is consistently updated and forms the image of the information contents inside the memory means MNVC pertaining to each "smart" household appliance.

The contents of said "data base" can be sent at regular intervals by the telephone node MC to a Service and Preventive Maintenance Centre for the above purposes. In fact, the telephone node MC can be programmed for sending at regular intervals (e.g. every 24 hours or other time interval, eventually programmable through appropriate external means that can be associated to the power line communication system), to an external Service and Preventive Maintenance Centre called "data base", containing the information made available to the power network RE by various "smart" household appliances.

Said "data base" stored in the non volatile memory means of the telephone node MC can have access directly from outside through a call to the telephone node MC. In view of this possibility of interaction with the mobile telephone TC, the presence of said memory means MNVT of the telephone node MC, which perform a buffer memory function or a buffering function between the external communication networks, i.e. Internet web IN or the mobile phone network where the mobile telephone TC generally operates at higher speeds, and the network RE, operating at a lower speed.

Thus, anyone having access from outside can view the status of the household appliances and users connected to the network RE at the speed allowed by the external network wherefrom access is obtained.

This is particularly important, for instance in the event of a large Service Centre performing a large number of daily inspections and scanning a large number of local networks RE, since all waiting times saved will result in a considerable saving of total time and possibly make a practicable service.

The following is an example of a possible communication protocol between the mobile telephone TC and local network RE, i.e. the household appliances connected to it.

The communication protocol between the mobile telephone TC and "smart" household appliances, such as the oven FO through the GSM modem MG, is based on three instruction types as follows:

Remote control commands
Remote state monitoring
Remote events signalling.

The possibility of defining likely additional specifications related to the features of the electric users is provided for all three instruction types.

Tables 1 reports a list of the household appliances connected to the network RE of FIG. 1 with the example codes assigned to them.

The above list is only reporting the appliances represented in FIG. 1, but a television set may also be implemented, intended as a means through which alphanumerical messages sent through the mobile telephone GSM can be appropriately displayed, or a general Internet connecting device. More generally, codes may also be assigned to:
- other household appliances, such as dryers, microwave ovens, cooking hobs;
- household systems, such as conditioning systems, heating systems, safety systems, anti-intrusion systems, lighting systems, sprinkler systems.

TABLE 1

| Code | Electric User |
| --- | --- |
| LBx | Laundry washing machine |
| LSx | Dishwasher |
| FGx | Refrigerator |
| COx | Freezer |
| FOx | Oven |

The codes reported on the first column are utilized during SMS message transmission for identifying the user (or users) referred to in the communication.

In the event, where a household environment has more than one of the same electric appliance, such as two washing machines. their differentiation will be obtained by means of a third character (indicated with "X" in the Table), which is a numerical character.

A coding example may be as follows:

LB0: main laundry washing machine

LB1: washing machine

OV0: electric oven

The following Table 2 reports possible instructions from C1 to C11 for remote control of household electric users connected to the network RE.

This list containing the remote control basis of household users is indicated by way of non limiting example and known in a per se manner, with the exception of the instruction C11.

Each instruction is selected from the menus available on the mobile telephone TC, which are automatically translated in the appropriate coded string of characters for transmission to the mobile modem MG of the telephone node MC.

Instructions for remote control may be as follows:

START (C1) Immediate start of operation cycle (wash, cooking, . . . ) of the household appliance and its normal execution.

STOP (C2) Immediate final stop of cycle execution of the household appliance.

PA USE (C3) Immediate pause of household appliance operation.

PAUSE END PHASE (C4) Operation cycle pause at the end of a current work step.

DELAY (a,b,c) (C5) Delayed cycle start or instruction to end appliance operation.

RESET (C6) Cancellation of all setting information of the appliance operation cycle (program data+delay+ . . . ). Execution of this instruction will force a STANDBY status of the appliance (independently from any previous status).

PROGRAM DATA (C7) MI (Manufacturer identifier)+proprietary information related to the appliance operation cycle. This instruction represents the most important element to differentiate between the various household appliances manufacturers.

START IF . . . Condition=true (C8) Starting cycle execution in the occurrence of a condition expressed by means of an appropriate parameter (or set of parameters).

SELFTEST (C9) Request of immediate execution for Selftest routine. In order to execute the instruction, the appliance should be in Standby status.

GETparam. (C10) GET is an instruction to be followed at least by one of the following parameters:

STATUS: request of the system current operation status

CONFIG: returns the whole set of system configuration parameters

SEND A MESSAGE (TEXT . . . ) (C11) Sends an alphanumerical message for continuous display (until it receives an appropriate local feedback from the consumer) on an available display element in the house, such as a TV set, appliance display, etc.)

The last two instructions (C10 and C11) differ from the other instruction for their general purpose; they concern the whole system.

In particular, instruction C10 GET CONFIG outputs the system configuration (number and type of available appliances, possible alarm systems, heating, lighting, etc, . . . ), which can be controlled with a remote procedure. These information are used for menu self-configuration of the GSM mobile telephone that has sent such an instruction.

In the specific instance of the instruction C11 SEND A MESSAGE TEXT . . . ), this is particularly important because a message will appear on the display of any household appliance adequately preset to this purpose, i.e. either equipped with a display or on the display D of the telephone node MC. The system in the mobile telephone TC for managing characters input is configured in line with this instruction C11 to accept alphanumerical characters in a free format and send the message to the telephone node MC by pressing a transmission button.

Information related to the operation status of users U connected to the network RE can also be received on the mobile telephone TC. By way of example, these information may be:

OFF (S1) Household appliance not connected to the power mains.

STAND BY (S2) Household appliance connected to the power mains (ON) waiting for the programming data related to its operation cycle and a likely execution instruction.

PROGRAMMED (S3) The household appliance has already received the programming data for its operation cycle and is ready for a start instruction to execute the cycle.

PROGRAMMED WAITING TO START (S4) The household appliance has received a conditioned execution instruction (START IF . . . ), is waiting for the performance of the relevant condition (delay, power, rate . . . ) and is ready to execute a likely start instruction for immediate cycle execution (START).

RUNNING (S5) The household appliance is performing its operation cycle.

CYCLE FINISHED (S6) The household appliance has ended its operation cycle and is now in STAND BY status.

FAILURE (S7) Execution of the operation cycle has been definitively stopped due to an irreversible failure. If the appliance is equipped with an advanced self-diagnose system, the kind of fauilure will be detailed as well.

PAUSE (S8) The household appliance cycle is in a temporary pause status waiting for an instruction to continue cycle execution.

CYCLE INTERRUPTED (S9) The household appliance has been forcedly induced to interrupt execution of its operation cycle definitively and is in STAND BY status.

RUNNING GOING TO PAUSE (S10) The household appliance has received a PAUSE END PHASE instruction and is waiting to end the running cycle step and take the PAUSE status.

SELFTEST (S11) The household appliance is performing its self-test routine. The request of the status of the whole control system for a set of electric users is performed through the instruction C10 GET STATUS as seen in Table 2.

Control system feedback of a set of electric users consists of an SMS message containing coded information on the whole system status to be displayed by the mobile telephone TC following appropriate decoding.

The codes associated to individual users U are indicated in the previous Table 1; the codes associated to an individual status are indicated between brackets (S1 . . . S11).

At least four possible event types concerning a user U or an automatic home system (such as an alarm and/or safety system) can be signalled by the network RE through the telephone node MC:

Notices E1: Information to the consumer about normal operation of the household appliance, such as "Washing has come to end!" "Cooking is over!"

Warnings E2: Information of possible non dangerous problems for individuals (neither for individuals nor for the environment), which have occurred with reference to the household appliance, such as "Refrigerator door left open for the past 5 minutes".

Alarms E3: Information of serious problems (which may cause serious damages to the consumer and/or environment), concerning the household appliance or in general the household environment, such as "Freezer temperature has reached a dangerous value for food preservation"; "Gas or water alarm"; "Intrusion-proof alarm".

Failures E4: Information (optional, deactivated by default) on possible problems strictly connected to the appliance operation, which do not entail any safety problems but will affect performance of the operation cycle of the household appliance itself, such as "Washing machine does not take water in!", "Dishwasher pump fault!" "Refrigerator temperature sensor fault!"

When such an event occurs, a call is placed to one or more GSM mobile telephones TC only if pertaining to a type (event E1, E2, E3 and E4) preliminarily enabled by the consumer through a remote control, such as through the mobile telephone TC or appropriate local configuration means. Information are only sent to enabled mobile telephones TC. In order to enable a mobile telephone TC, it is necessary to input its relevant number in the telephone node memory MC through an appropriate local installation procedure.

Therefore, the menu of the receiving GSM mobile telephone TC should provide the possibility of enabling/disabling transmission of the messages generated by any events associated to the control system of a set of electric users.

The message sent by the telephone node MC consists of a normal string of alphanumerical characters (standard SMS message), expressing an information contents coherent with the event just occurred. As a result, such a message is entirely managed by the control system of a set of electric users.

Finally, it is also possible to communicate setting parameters defining information exchange procedures between the electric users system and the mobile telephone TC, which ensure the remote control of the system and are primarily related to the telephone node MC.

The number of setting parameters depend on the complexity of the electric users system and dialog sophistication with the mobile telephone TC remotely connected with it. From the above description the features of the present invention are apparent, and also its advantages are clear.

Advantageously, the system for monitoring and controlling a set of electric users described by way of example allows the removal of one of the network nodes incorporating the mobile phone gateway in one of the household appliances, in particular the laundry washing machine.

The system for monitoring and controlling a set of electric users according to the present invention is particularly advantageous as it can be incorporated in the washing machine upper panel or top. In fact, said top is optional, so the consumer can initially purchase a laundry washing machine that is only preset for interaction with a power line network and for the use of functions locally available, such as managing power consumption. The possibility of communicating through mobile phone connection, such as its control through a mobile telephone, can be added later to the local network, simply adding the top to the machine.

This is also quite advantageous considering the possibility for the consumer of adding a communication means with the environment outside in a comfortable compact manner also in the instance of a minimum household appliance set, i.e. even if only a laundry washing machine is available, instead of waiting for having a more consistent appliances set to implement a communication function with the environment outside It is clear that many changes are possible for the man skilled in the art to the system for monitoring and controlling a set of electric users, described by way of example, without departing from the novelty spirit of the innovative idea, and it is also clear that in practical actuation of the invention the components illustrated may often differ in form and size and be replaced with technical equivalent elements.

The modem pertaining to the telephone node can be e.g. a conventional modem apt for communicating on the conventional PSTN (analog) or ISDN (digital) telephone line. The mobile telephone may contain the protocol for communicating with the local network in an internal memory, i.e. the protocol is already integrated in the mobile telephone or contained in special SIM cards. The instructions from said protocol may also be unloaded from remote sources, such as special Internet web sites, using WAP technologies.

Without departing from the present invention, the telephone node, in particular a mobile one, may also be coupled to other devices associated either internally or externally to said household appliance, sharing its resources, such as the interface module or memory resources.

The invention claimed is:

1. A system for monitoring and controlling one or more electric users that communicate over a first communication network, the system including:

A. one or more nodes for communicating between respective ones of the one or more electric users over the communication network and communicating peer-to-peer with each other; and B. a transmitter/receiver incorporated into a given one of the one or more electric users for communicating between the communication network and a remote network or remote terminal, the transmitter/receiver and the given electric user sharing the same node, the transmitter/receiver receiving SMS messages from the remote network or remote terminal and transmitting SMS messages to the remote network or remote terminal, the SMS messages from the remote network having coded therein control instructions including at least one of:
  i. a start instruction, for the immediate start of the operation cycle of an electric user;
  ii. a stop instruction, for the immediate stop of the operation cycle being executed by an electric user;
  iii. a pause instruction, for the pause of an electric user;
  iv. a delay instruction, for a delayed execution of an instruction to an electric user;
  v. a reset instruction, for the cancellation of all setting information of an electric user operation cycle;
  vi. a self-test instruction, for the execution of a self-test routine of said electric user; and
  vii. a get instruction, for the transmission of status information or configuration parameters of an electric user.

2. The system for monitoring and controlling a set of electric users, according to claim 1, wherein the transmitter/receiver includes the node that is shared by the transmitter/receiver and the given electric user.

3. The system for monitoring and controlling a set of electric users, according to claim 2, wherein the transmitter/receiver communicates with a control system of the given electric user.

4. The system for monitoring and controlling a set of electric users, according to claim 3, wherein the transmitter/receiver includes a modem.

5. The system for monitoring and controlling a set of electric users, according to claim 3, wherein the modem is a mobile phone modem.

6. The system for monitoring and controlling a set of electric users, according to claim 3, wherein the transmitter/receiver is incorporated into a structural element of the given electric user.

7. The system for monitoring and controlling a set of electric users, according to claim 6, wherein the structural element attaches to the given electric user.

8. The system for monitoring and controlling a set of electric users, according to claim 7, wherein the structural element is a panel of the given electric user.

9. The system for monitoring and controlling a set of electric users, according to claim 6, wherein the given electric user is a laundry washing machine and the panel is incorporated into a top section of the washing machine.

10. The system for monitoring and controlling a set of electric users, according to claim 1, wherein:
  a. the one or more electric users include control systems, and
  b. the transmitter/receiver further includes a memory for storing information provided from the control systems of the one or more electric users.

11. The system for monitoring and controlling a set of electric users, according to claim 1, wherein the transmitter/receiver establishes a communication channel with the remote network or remote terminal for all of the electric users.

12. The system for monitoring and controlling a set of electric users, according to claim 10, wherein the memory stores at least diagnostic and statistical information provided at various times from the control systems of the users.

13. The system for monitoring and controlling a set of electric users, according to claim 10, wherein the transmitter/receiver provides access to the contents of the memory from the remote network or remote terminal.

14. The system for monitoring and controlling a set of electric users, according to claim 5, wherein the remote terminal is a mobile telephone that communicates with the communication network through the mobile telephone modem.

15. The system for monitoring and controlling a set of electric users, according to claim 14, wherein the transmitter/receiver receives alphanumeric messages from the mobile telephone and communicates the messages to the electric users over the communication network.

16. The system for monitoring and controlling a set of electric users, according to claim 15, wherein a given electric user includes a display for displaying the alphanumerical messages from the mobile telephone.

17. A household appliance for performing a household task, the household appliance being adapted to communicate over a communication network that includes one or more electric users and between the communication network and a remote network or remote terminal, the household appliance including:
  A. a transmitter/receiver for providing information from the communication network to the remote network or remote terminal and receiving information from the remote network or remote terminal;
  B. a node for communicating over the communication network, the node providing to the transmitter/receiver information from the communication network and providing to the communication network information from the household appliance and from the transmitter/receiver, with the household appliance communicating peer-to-peer with the electric users over the communications network;
  C. the transmitter/receiver receiving SMS messages from the remote network or remote terminal and transmitting SMS messages to the remote network or remote terminal, the SMS messages having coded therein control instructions including at least one of:
    i. a start instruction, for the immediate start of the operation cycle of the household appliance;
    ii. a stop instruction, for the immediate stop of the operation cycle being executed by the household appliance;
    iii. a pause instruction, for the pause of the household appliance;
    iv. a delay instruction, for a delayed execution of an instruction to the household appliance;
    v. a reset instruction, for the cancellation of all setting information of the household appliance operation cycle;
    vi. a self-test instruction, for the execution of a self-test routine of the household appliance;
    vii. a get instruction, for the transmission of status information or configuration parameters of the household appliance.

18. The household appliance according to claim 17 wherein the transmitter/receiver includes a modem.

19. The household appliance according to claim 17 further including a display for displaying messages from
  i. the communication network,
  ii. the remote network or remote terminal, and
  iii. the given electric user.

20. The household appliance according to claim 17 wherein
  the transmitter/receiver further includes a memory for retaining selected information circulating on the communication network and provided to the transmitter/receiver through the node, and the transmitter/receiver transmits certain of the information retained by the memory to the remote network or remote terminal.

21. The household appliance according to claim 17 wherein the transmitter/receiver communicates with a control system of the appliance and retains information provided by the control system in the memory.

22. The household appliance according to claim 21 wherein the transmitter/receiver further stores in the memory information provided over the communications network from the control systems of the respective electric users.

23. The household appliance according to claim 22 wherein the transmitter/receiver establishes a communication channel with the remote network or remote terminal for the electric users.

24. The household appliance according to claim 23 wherein the memory stores at least diagnostic and statistical information provided at various times over the communications network from the control systems of the electric users.

25. The household appliance according to claim 24 wherein the transmitter/receiver provides access to the contents of the memory from the remote network or remote terminal.

26. The household appliance of claim 17, wherein the household appliance is a laundry washing machine, and
   a said transmitter/receiver is incorporated into a top section of said laundry washing machine; and
   b. said node provides to the communication network information from said laundry washing machine, with said laundry washing machine communicating with the electric users over the communications network.

27. A household appliance for performing a household task, comprising:
   i) an electronic control system for monitoring and controlling said household appliance;
   ii) a telephone node for connecting said household appliance to a remote terminal through a telephone network;
   iii) a communication line between said electronic control system and said telephone node; and
   iv) said telephone node transmits over said communication line, to said electronic control system, control instructions received from said remote terminal and said telephone node further transmits, to said remote terminal, status information that is related to said household appliance and generated by said electronic control system, to allow remote monitoring of said household appliance, said telephone node receiving SMS messages from said remote network or remote terminal and transmitting SMS messages to said remote terminal, said SMS messages having coded therein control instructions including at least one of:
   a. a start instruction, for the immediate start of the operation cycle of said household appliance;
   b. a stop instruction, for the immediate stop of the operation cycle being executed by said household appliance;
   c. a pause instruction, for the pause of said household appliance;
   d. a delay instruction, for a delayed execution of an instruction to said household appliance;
   e. a reset instruction, for the cancellation of all setting information of said household appliance operation cycle;
   f. a self-test instruction, for the execution of a self-test routine of said household appliance;
   g. a get instruction, for the transmission of status information or configuration parameters of said household appliance.

28. The household appliance according to claim 27, wherein said telephone node comprises a mobile phone modem, for connecting said household appliance to said remote terminal through a mobile phone network.

29. The household appliance according to claim 27, wherein said household appliance further comprises a display for displaying information received from said remote terminal or from said electronic control system.

30. The household appliance according to claim 27, wherein the telephone node is incorporated into a structural element of said household appliance.

31. The household appliance according to claim 27, wherein said household appliance comprises a laundry washing machine.

32. The household appliance according to claim 31, wherein the telephone node is incorporated into the top panel of said laundry washing machine.

33. The household appliance according to claim 27, wherein said household appliance comprises one of a dishwasher, a refrigerator, a freezer or an oven.

34. The household appliance according to claim 27, wherein said household appliance further comprises non volatile memory means, for storing said control instructions and said status information.

35. The household appliance according to claim 34, wherein said non volatile memory means further stores statistical and diagnostic information that are generated at regular intervals by said electronic control system.

36. The household appliance according to claim 34, wherein said telephone node provides access to the contents of said non volatile memory means from said remote terminal.

37. The household appliance according to claim 34, wherein telephone numbers are stored in said non volatile memory means through an installation procedure, and said telephone node connects said household appliance to remote terminals corresponding to said telephone numbers.

38. The household appliance according to claim 27 wherein said household appliance further comprises a display for displaying information received from said remote terminal or from said electronic control system, and said display displays said SMS messages.

39. The household appliance according to claim 27, wherein said status information is coded in said SMS messages.

40. The household appliance according to claim 39, wherein said coded status information include at least one of:
   a. an off piece of information, for signalling that said household appliance is disconnected from the power mains;
   b. a stand-by piece of information, for signalling that said household appliance is connected to the power mains and waiting an execution instruction;
   c. a running piece of information, for signalling that said household appliance is performing an operation cycle;
   d. a cycle finished piece of information, for signalling that said household appliance has ended an operation cycle;
   e. a failure piece of information, for signalling an irreversible stop of an operation cycle of said household appliance due to an irreversible failure;
   f. a self-test piece of information, for signalling that said household appliance is performing a self-test routine.

41. The household appliance according to claim 27, wherein said telephone node is able to signal to said remote terminal, by means of SMS messages, at least one of:
  a. notices about normal operation of said household appliance;
  b. warnings about possible non dangerous problems having occurred to said household appliance;
  c. alarms about possible serious problems concerning said household appliance or the environment of said household appliance;
  d. failures about possible problems correlated to the operation of said household appliance and affecting performance of the operation cycle of said household appliance.

42. The household appliance according to claim 27, wherein
  said electronic control system is equipped with a self-diagnosis system that recognizes the kinds of failures that possibly occur to said household appliance, and
  said telephone node signals to said remote terminal, by means of SMS messages, the kinds of the failures in coded forms, in order to allow in a remote location the collection of diagnostic information relative to said household appliance.

\* \* \* \* \*